US011755660B2

(12) United States Patent
Sampath et al.

(10) Patent No.: US 11,755,660 B2
(45) Date of Patent: *Sep. 12, 2023

(54) DATABASE OPERATION CLASSIFICATION

(71) Applicant: HEWLETT PACKARD ENTERPRISE DEVELOPMENT LP, Houston, TX (US)

(72) Inventors: Rangaprasad Sampath, Bangalore (IN); Madhusoodhana Chari Sesha, Bangalore (IN); Shree Phani Sundara B N, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,078

(22) Filed: Dec. 7, 2021

(65) Prior Publication Data

US 2022/0092114 A1 Mar. 24, 2022

Related U.S. Application Data

(63) Continuation of application No. 16/264,923, filed on Feb. 1, 2019, now Pat. No. 11,222,078.

(51) Int. Cl.
G06F 16/906 (2019.01)
G06N 20/00 (2019.01)

(52) U.S. Cl.
CPC ........... *G06F 16/906* (2019.01); *G06N 20/00* (2019.01)

(58) Field of Classification Search
CPC ........ G06F 16/90; G06F 16/906; G06N 20/00
See application file for complete search history.

(56) References Cited

U.S. PATENT DOCUMENTS

| 6,167,534 A | 12/2000 | Straathof et al. |
| 9,836,696 B2 | 12/2017 | Vasseur et al. |
| 10,250,451 B1 | 4/2019 | Moghe et al. |
| 11,074,229 B1 | 7/2021 | Slutsker et al. |
| 2009/0313041 A1 | 12/2009 | Eder |
| 2015/0081646 A1 | 3/2015 | Jin et al. |
| 2015/0095432 A1 | 4/2015 | Soundararajan |
| 2016/0232206 A1 | 8/2016 | Hayamizu et al. |

(Continued)

FOREIGN PATENT DOCUMENTS

WO 2004/075061 A1 9/2004

OTHER PUBLICATIONS

"Arista Networks EOS", Jul. 9, 2018, available online at <https://web.archive.org/web/20180709082241/https://www.arista.com/en/products/eos>, 7 pages.

(Continued)

*Primary Examiner* — Kris E Mackes
(74) *Attorney, Agent, or Firm* — Brooks, Cameron & Huebsch, PLLC

(57) ABSTRACT

An example method can include tracking, by a network device, a plurality of database operations performed and a plurality of expected database operations for an event that executes for a time period, generating, by the network device, a plurality of clusters based on a ratio of the database operations performed compared to the plurality of expected database operations and the time period for the event, classifying, by the network device, the clusters based on performance, and evaluating, by the network device, a system performance metric based on a classification of real time data into the clusters.

20 Claims, 5 Drawing Sheets

(56) References Cited

U.S. PATENT DOCUMENTS

2018/0357331 A1   12/2018   Wen et al.

OTHER PUBLICATIONS

"Aruba 8400 Core and Aggregation Switch", Jan. 16, 2019, available online at <https://web.archive.org/web/20190116002523/https://www.arubanetworks.com/aruba-8400/>, 4 pages.

"OpenSwitch", Jan. 22, 2019, available online at <https://web.archive.org/web/20190122043621/https://www.openswitch.net/>, 4 pages.

Jason Brownlee, "Supervised and Unsupervised Machine Learning Algorithms", Mar. 16, 2016, available online at <https://machinelearningmastery.com/supervised-and-unsupervised-machine-learning-algorithms/>, 39 pages.

Narayan, S. et al., Performance Analysis of Network Operating Systems in Local Area Networks, (Research Paper), 2nd WSEAS International Conference on Computer Engineering and Applications (CEA'08) Acaputco, Mexico, Jan. 25-27, 2008, pp. 186-188.

Pfaff et al., "The Open vSwitch Database Management Protocol", Dec. 2013, RFC 7047, available online at <https://tools.ietf.org/html/rfc7047>, 35 pages.

Tom Black, "ArubaOS-CX. A Modern, Programmable Network for the Mobile and IoT Age", Aug. 14, 2017, available online at <https://blogs.arubanetworks.com/solutions/arubaos-cx-a-modem-programmable-network-for-the-mobile-and-iot-age/>, 5 pages.

Wikipedia, "K-Means Clustering", Jan. 26, 2019, available online at <https://en.wikipedia.org/w/index.php?title=K-means_clustering&oldid=880299788>, 14 pages.

Wikipedia, "Machine Learning", Jan. 31, 2019, available online at <https://en.wikipedia.org/w/index.php?title=Machine_learning&oldid=881039124>, 18 pages.

DATABASE OPERATION CLASSIFICATION

CROSS REFERENCE TO RELATED APPLICATIONS

This application is a continuation of U.S. patent application Ser. No. 16/264,923, filed on Feb. 1, 2019, issued as U.S. Pat. No. 11,222,078 the contents of which is incorporated herein by reference in its entirety.

BACKGROUND

A network, also referred to as a computer network or a data network, is a digital telecommunications network which allows nodes (e.g., computing devices, network devices, etc.) to share resources. In networks, nodes exchange data with each other using connections (e.g., data links) between nodes. These connections can be established over cable media such as wires or optic cables, or wireless media such as a wireless local area network (WLAN).

DETAILED DESCRIPTION

Network devices such as network switching devices (e.g., switches) are deployed in varied customer environments across diverse enterprise customer segments such as hospitality, medical care, university, and enterprise campus, among others. Network devices can include a database-centric network operating system (NOS). Database-centric NOSs a database can be utilized to store user configured data and keep track of a system state and statistics related to the network devices.

In some examples, a NOS model can be utilized to map or model relationships between various features and/or components supported by the network device via a database schema that includes tables, rows, and/or columns. The relationships can include one to many and/or many to one relationships. Thus, a change in the map or model of the relationships such as a changed value in the table can lead to multiple additional changes to the map or model of the relationships. In some examples, when a value within a table is altered, a subsequent change to other affected values may not occur. Thus, in these systems, it can be advantageous to utilize a ratio of actual database operations to expected database operations for the network device over a period of time.

Examples of the present disclosure provide for a system performance metric of a network device using machine learning on the network device. For instance, an example method can include tracking, by a network device, a plurality of database operations performed and a plurality of expected database operations for an event that executes for a time period, generating, by the network device, a plurality of clusters based on a ratio of the database operations performed compared to the plurality of expected database operations and the time period for the event, classifying, by the network device, the clusters based on performance, and evaluating, by the network device, a system performance metric based on a classification of real time data into the clusters.

Some examples of the present disclosure can affect the functionality of a network device (e.g., improve the functionality), such that the network device can perform functions based on a system performance metric. By determining and using statistical properties and/or attributes associated with database operation ratios and a quantity of time a network switch is capable of performing during a particular event. In some examples, the statistical properties and/or attributes can be utilized to provide insights into system performance and generate a model of system performance under different conditions.

Figure 1:
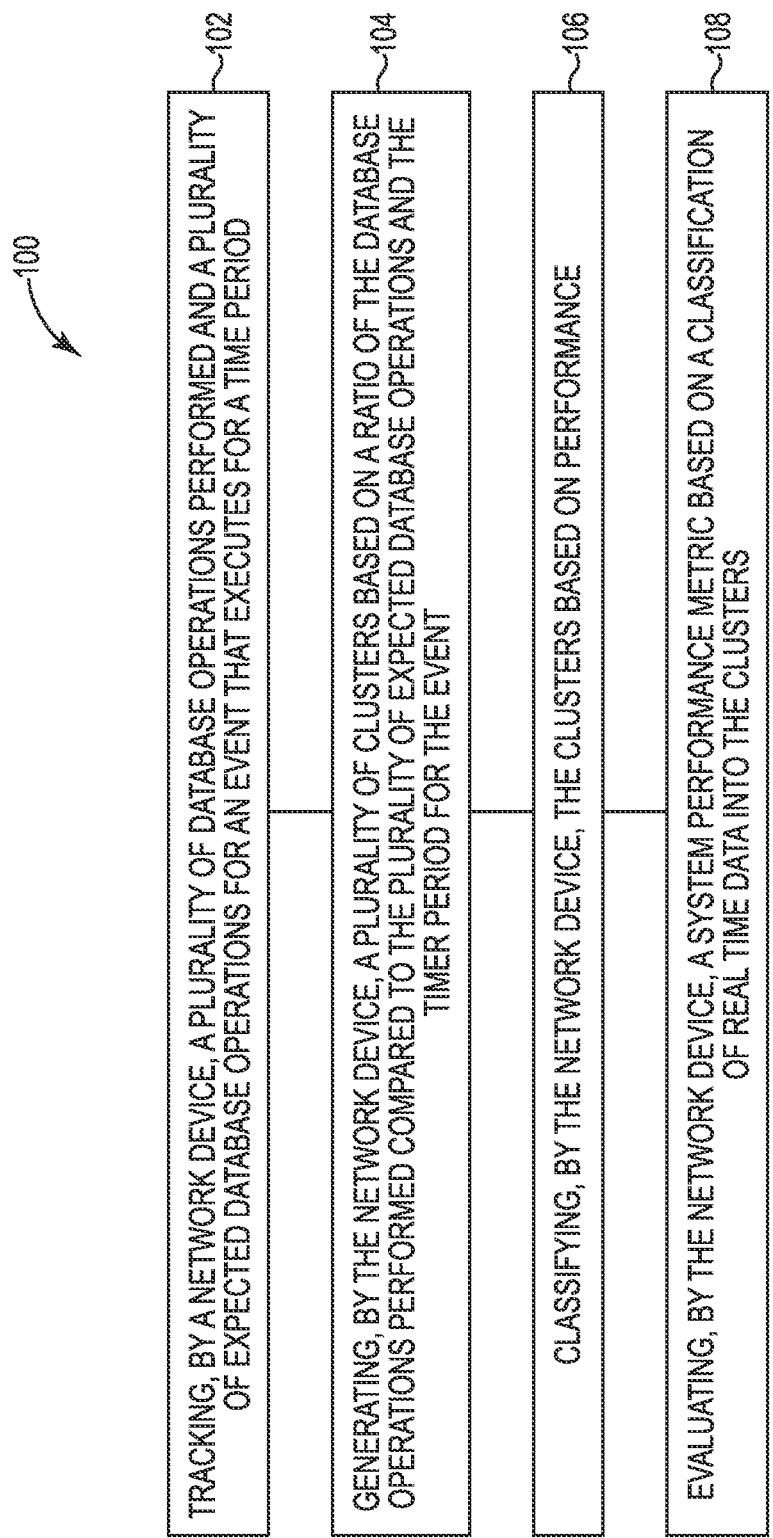
FIG. 1 is an example method for database operation classification consistent with the present disclosure

FIG. 1 is an example method 100 for database operation classification consistent with the present disclosure. In some examples, the method 100 can be instructions that can be stored in a memory resource and executable by a processing resource. For example, the method 100 can be performed by a computing device and/or controller of a network device.

Method 100, at 102 can include tracking, by a network device, a plurality of database operations performed and a plurality of expected database operations for an event that executes for a time period. Tracking the plurality of database operations, in some examples, includes the network device tracking a plurality of attributes such as VLAN information, port information, and/or other statistical data associated with the network device.

In some examples, the plurality of database operations can include operations performed on one or more tables associated with a network device. For example, the plurality of database operations can include altering a MAC address table, altering a VLAN table, and/or altering a port table. For a particular event, such as altering a table associated with the network, device, a particular quantity of database operations can be expected, and a particular quantity of database operations can occur. For this particular event, a ratio of the expected database operations and the number of actual occurrences of database operations for a time period can be determined.

As used herein, a network device can be a device that can receive and/or send network packets. For example, the network device can be a switching device that can be utilized to analyze network packets and direct the network packets to a receiving device. As described herein, the network device can have a corresponding set of tables that describe features of the network device. In some examples, the tables can be updated during operation of the network as the features of the network device change. For example, a MAC address table can be updated when MAC addresses are changed during operation, a VLAN table can be updated when a VLAN has changed during operation, and/or a port table can be updated when a port for a particular MAC address or VLAN has been changed during operation. Thus, tracking the plurality of database operations performed and a plurality of expected database operations for an event that executes for a time period can include tracking the changes of a plurality of tables corresponding to the network device during an event that occurs for the time period.

At 104, method 100 can include generating, by the network device, a plurality of clusters based on a ratio of the database operations performed compared to the plurality of expected database operations and the time period for the event. In some examples, the ratio of the database operations performed compared to the plurality of expected database operations can be displayed in a graphical representation. In some examples, the graphical representation can be a dot graphical representation where each data point is represented by an image such as a dot with an x-axis as a period of time and a y-axis as the ratio. In some examples, generating the plurality of clusters includes utilizing a machine learning clustering mechanism to generate a model of a plurality of data points based on the ratio.

In some examples, a plurality of data points that each represent a ratio and corresponding time can be displayed as the graphical representation and utilized to generate a plurality of clusters. In some examples, the plurality of clusters can be areas of the graphical representation with a quantity of data points that exceed a particular threshold. For example, a relatively higher quantity of data points can be positioned within a particular area. In this example, the particular area can be a first cluster of a plurality of clusters that are generated for the graphical representation.

In some examples, a generated cluster can correspond to a particular performance compared to other generated clusters. For example, a cluster generated in a first area can correspond to a first performance level of a particular device over a particular time period and a second area that is different than the first area can correspond to a second performance level of the particular device.

At 106, method 100 can include classifying, by the network device, the clusters based on performance. In some examples, the plurality of generated clusters can be classified and/or categorized based on the location of the cluster within the graphical representation. For example, a first cluster positioned near a lower left corner of the graphical representation can be representative of a cluster with a first classification or type (e.g., good performance, performance above median performance, etc.). In this example, a second cluster positioned near an upper right corner of the graphical representation can be representative of a cluster with a second classification or type (e.g., poor performance, performance under a median performance, etc.). Furthermore, in this example, a third cluster positioned between the first cluster and the second cluster can be representative of a third classification or type (e.g., expected performance, manufacturer specification performance, etc.).

In some examples, classifying the plurality of clusters includes identifying a location of the clusters within a graphical representation of the ratio and time period for the event. As described herein, classifying the clusters can include classifying an area of the graphical representation such that real time data points can be more easily classified based on a location of the data point with respect to the clusters. For example, each area of a graphical representation can be put into a particular classification or type such that each received data point can be classified based on a position or location of the data point on the graphical representation. In some examples, each of the plurality of clusters can cover a non-overlapping area of the graphical representation. That is, a first cluster may not overlap a second cluster. In this way, the real time ratios can be more easily classified since the real time ratio can not fall into multiple clusters.

In some examples, the areas of the graphical representation can be illustrated with ratio ranges and/or time ranges such that a numerical value of the data point can be categorized based on the value ranges. In this way, a graphical representation can be utilized to generate the clusters and the clusters can be utilized to generate value ranges for each cluster.

At 108, method 100 can include evaluating, by the network device, a system performance metric based on a classification of real time data into the clusters. As described herein, real time data can be evaluated in real time by assigning the real time data into one of the plurality of clusters. In some examples, the real time data can be assigned to a cluster based on a position of the real time data within a graphical representation (e.g., which cluster does the real time data fall within, etc.). In some examples, the real time data can be compared to value ranges associated with each of the plurality of clusters to determine which of the plurality of clusters the real time data should falls within.

In some examples, the method 100 can include comparing historic ratios of the database operations to real time ratios to determine alterations of the system performance metric over a period of time. In some examples, the ratios of historic database operations can be stored in a database or other type of memory resource. In these examples, the real time data and/or real time ratios can be compared to the ratios stored in the database to determine if performance of a network device has changed over time. In some examples, comparing the historic ratios to the real time ratios can be utilized to identify a network device that is about to fail. For example, the historic ratios can indicate a relatively high performance and a real time ratio can indicate a relatively low performance. In this example, it can be determined that the network device has deteriorated in performance capability.

In some examples, the method 100 can include determining when the classification of real time data has changed from a first cluster to a second cluster. As described herein, historic ratios can be stored and utilized to compare with real time ratios. In a similar way, the method 100 can monitor the classification of the real time data and determine when the real time data has changed to a different duster. In some examples, the performance metric of the network device can alter for a number of different reasons. For example, the performance metric of the network device may change due to a change in a network topology. In another example, the performance metric for the network device may change due to a performance degradation where the network device is beginning to fail.

By identifying when the real time data has altered from a first cluster to a second cluster, notifications can be provided to an administrator that a performance of a particular network device is changing. For example, the method 100 can include generating a notification when the real time data has changed from the first cluster to the second cluster. In these examples, the notification can be generated and sent to a particular user or administrator based on the type of network device that has changed from the first cluster to the second cluster. In some examples, the notification can include the change in the performance metric and a time period of the cluster change. For example, the notification can include that the network device was previously in a "normal" performance metric and has changed to a "low" performance metric during a particular period of time.

In some examples, the real time data can be utilized to determine a system performance metric for the network device and/or the overall network. For example, the real time data associated with network device can be assigned to a cluster and the corresponding cluster assignment can be utilized to determine the system performance metric for the network device. In a similar way, a plurality of switches of the overall network can each be assigned to a particular cluster based on the ratio and time for the corresponding switches. In some examples, the cluster assignment for the plurality of network devices can be utilized to determine a system performance metric for the network.

Figure 2:
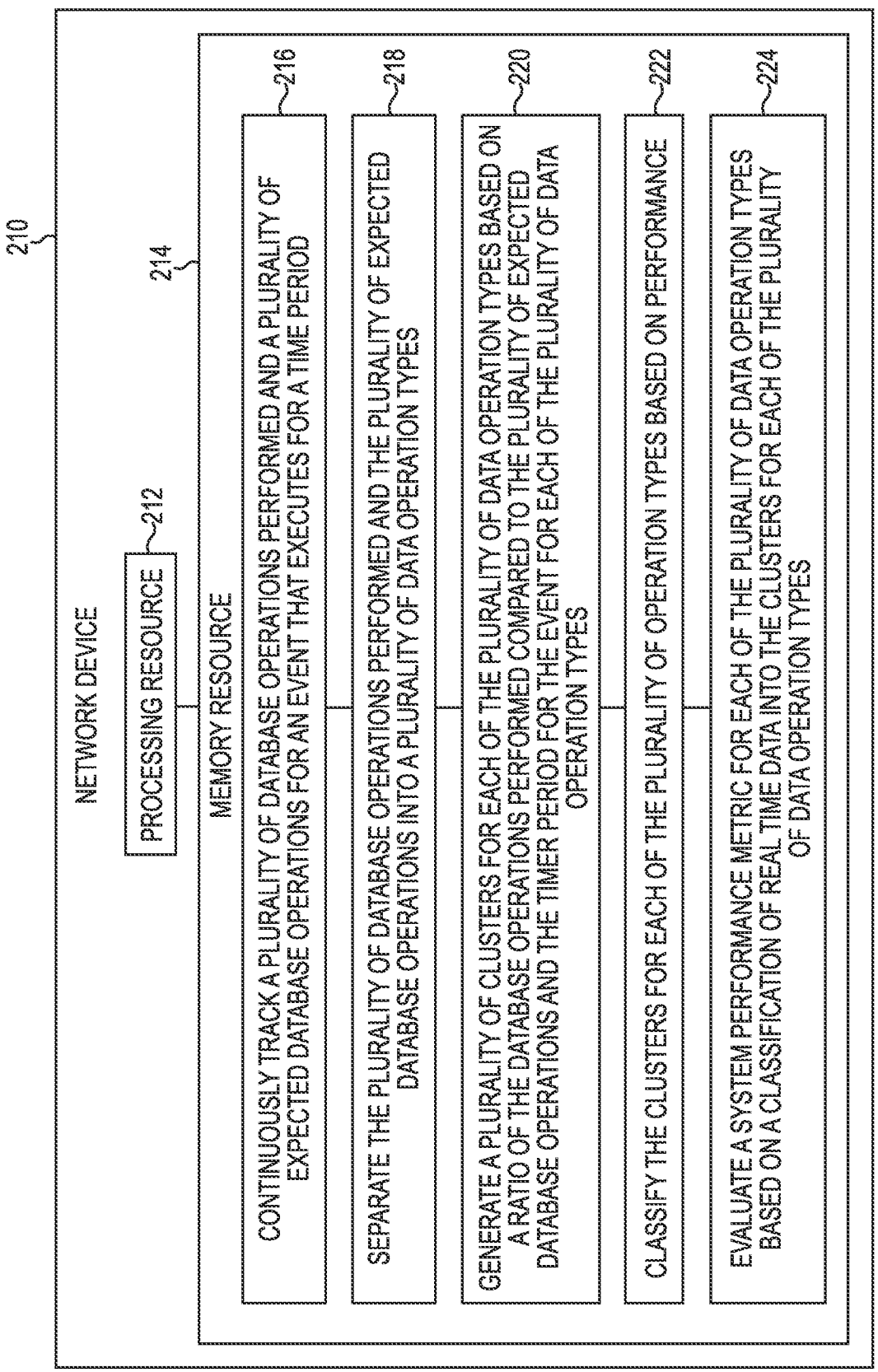
FIG. 2 is an example network device for database operation classification including a processing resource and a memory resource consistent with the present disclosure.

FIG. 2 is an example network device 210 for database operation classification including a processing resource 212 and a memory resource 214 consistent with the present disclosure. A network device 210, as used herein includes a device (e.g., physical device) used for communication and interaction between devices on a computer network. Network devices, such as network device 210 can mediate data in a computer network. Example network devices include switching devices (also known as "switches"), routers, router/switching device combinations, models, access points, gateways, networking cables, network interface controllers, and hubs, among others. In some instances, network device 210 can be or include a controller. Network device 210 can be a combination of hardware and instructions for device identifier classification. The hardware, for example can include processing resource 212 and/or a memory resource 214 (e.g., MRM, computer-readable medium (CRM), data store, etc.).

Processing resource 212, as used herein, can include a number of processing resources capable of executing instructions stored by a memory resource 214. The instructions (e.g., machine-readable instructions (MRI)) can include instructions stored on the memory resource 214 and executable by the processing resource 212 to implement a desired function (e.g., system performance measurement). The memory resource 214, as used herein, can include a number of memory components capable of storing non-transitory instructions that can be executed by processing resource 212. Memory resource 214 can be integrated in a single device or distributed across multiple devices. Further, memory resource 214 can be fully or partially integrated in the same device as processing resource 212 or it can be separate but accessible to that device and processing resource 212. Thus, it is noted that the network device 210 can be implemented on an electronic device and/or a collection of electronic devices, among other possibilities.

The memory resource 214 can be in communication with the processing resource 212 via a communication link (e.g., path). The communication link can be local or remote to an electronic device associated with the processing resource 212. The memory resource 213 includes instructions 216, 218, 220, 222, 224. The memory resource 214 can include more or fewer instructions than illustrated to perform the various functions described herein. In some examples, instructions (e.g., software, firmware, etc.) 216, 218, 220, 222, 224 can be downloaded and stored in memory resource 214 (e.g., MRM) as well as a hard-wired program (e.g., logic), among other possibilities.

Instructions 216, when executed by a processing resource such as processing resource 212 can continuously track a plurality of database operations performed and a plurality of expected database operations for an event that executes for a time period. In some examples, continuously tracking the plurality of database operations can include monitoring database operations for a particular time period and/or over a particular quantity of time. In some examples, the monitor that is monitoring the database operations can continuously track or monitor the plurality of database operations such that data points can be collected a plurality of times within the time period.

Instructions 218, when executed by a processing resource such as processing resource 212 can separate the plurality of database operations performed and the plurality of expected database operations into a plurality of database operation types. In some examples, the plurality of database operations performed and the plurality of expected database operations can be utilized to generate a ratio of the database operations performed to the plurality of expected database operations. As described herein, the database operations performed can include database operations that are actually performed by the network device and/or the network during a particular period of time.

In addition, the expected database operations can include database operations that are predicted to be performed during the particular time period. As described herein, the database operations can include operations that are performed by a database-centric network operating system (NOS). In some examples, a database can be utilized to store user configured data and store data related to system state and other statistics. In one example, a database operation can include updating a table associated with the network device and/or the network. In this example, there can be an expected quantity of table updates for a particular period of time and an actual quantity of table updates for the particular period of time. In this example, the ratio can be calculated and utilized to generate a graphical representation for a network device (e.g., switch) associated with the table updates.

Instructions 220, when executed by a processing resource such as processing resource 212 can generate a plurality of clusters for each of the plurality of database operation types based on a ratio of the database operations performed compared to the plurality of expected database operations and the time period for the event for each of the plurality of database operation types. In some examples, each of the plurality of database operation types corresponds to an operation performed by a computing device. For example, the database operation types can be different alterations to a particular table that corresponds to the network device. In some examples, a computing device either on the network device or at a remote location can perform the alterations to the table. In some examples, each of the plurality of database operation types correspond to the event (e.g., updating a table, etc.) during the time period.

In some examples, a plurality of data points can be collected to generate a graphical representation of the database operations, expected database operations, and/or a quantity of time to perform a function. As described herein, the graphical representation can include a ratio of the database operations performed and the expected database operations over a quantity of time it took a network device to perform a function.

In some examples, the graphical representation can be a dot graphical representation that utilizes an image such as a dot for each of a plurality of data points. In some examples, the graphical representation can be separated into the plurality of clusters based on a performance metric for the images within the cluster. For example, a cluster can be a particular area of the graphical representation such that images positioned within the particular area are assigned or classified with a particular performance metric.

Instructions 222, when executed by a processing resource such as processing resource 212 can classify the clusters for each of the plurality of operation types based on performance. In some examples, classifying the clusters can include assigning particular areas within the graphical representation with a particular performance metric. For example, a first area can be classified as a "normal" performance metric (e.g., expected performance metric, etc.), a second area can be classified as a "low" performance metric (e.g., under performance metric, etc.), and a third area can be classified as a "high" performance metric (e.g., super performance metric, etc.). In this way, when real time data is received, the real time data can be classified into one of the plurality of clusters. Thus, the real time data can be received and classified in real time based on the classification of the cluster that the real time data falls within.

In some examples, each of the plurality of database operation types can include a corresponding graphical representation and when real time data is received the data can be classified as one of the plurality of database operation types and the real time data can be implanted into the graphical representation to determine the classification. In some examples, the graphical representation for each of the plurality of database operations can be generated based on a testing period for the corresponding database operation type. As used herein, a database operation type can be a specific type of operation performed by the database centric NOS. For example, a first database operation type can include updating a port table for a network device and a second database operation type can include updating a MAC address table for a network device. Even though examples of updating various tables for a network device are described herein, the database operation types are not limited to these examples.

Instructions 224, when executed by a processing resource such as processing resource 212 can evaluate a system performance metric for each of the plurality of database operation types based on a classification of real time data into the clusters for each of the plurality of database operation types. In some examples, a system performance metric can be a value or classification of the database centric NOS. In some examples, the system performance metric can be determined based on a classification of real time data for the plurality of database operation types. That is, the classification of the real time data for each of the plurality of database operation types can be combined to determine the system performance metric for the database centric NOS.

Figure 3:
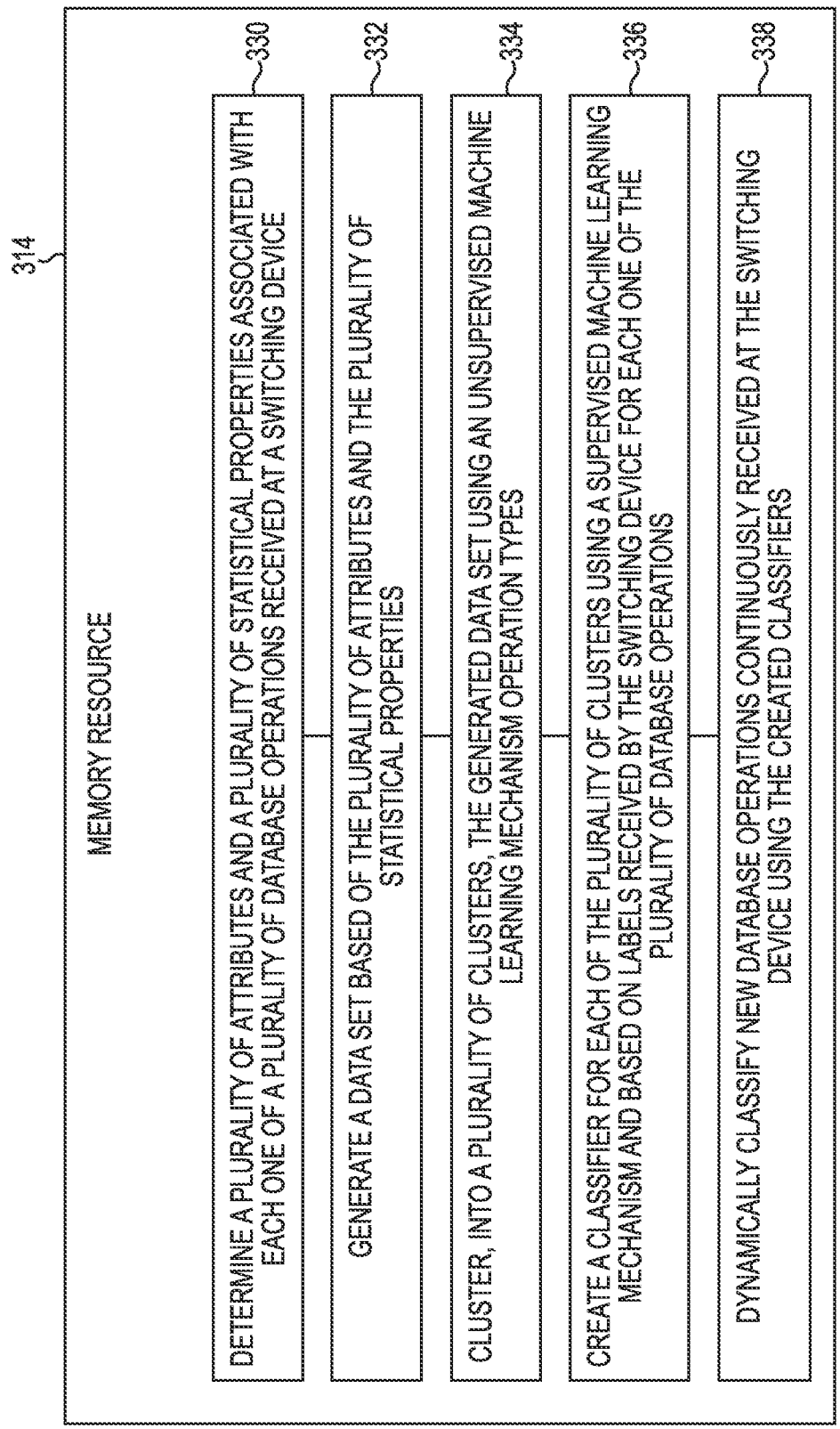
FIG. 3 is an example memory resource for database operation classification including instructions executable by a processing resource consistent with the present disclosure.

FIG. 3 is an example memory resource 314 for database operation classification including instructions executable by a processing resource consistent with the present disclosure. Processing resource, as used herein, can include a number of processing resources capable of executing instructions stored by a memory resource such as memory resource 314. The instructions (e.g., machine-readable instructions (MRI)) can include instructions stored on the memory resource 314 and executable by the processing resource to implement a desired function (e.g., system performance metric generation). The memory resource 314, as used herein, can include a number of memory components capable of storing non-transitory instructions that can be executed by processing resource. Memory resource 314 can be integrated in a single device or distributed across multiple devices.

Instructions 330, when executed by a processing resource can determine a plurality of attributes and a plurality of statistical properties associated with each one of a plurality of database operations received at a switching device. In some examples, the plurality of attributes can include a database operation type. As described herein, the database operation type can be a type of operation performed by a network device. In some examples, the statistical properties associated with the plurality of database operations can include, but are not limited to: a quantity of time it takes for a network device to perform a function, a quantity of database operations performed, a quantity of expected database operations to be performed, and/or a type of database operation performed. In some examples, the network device can update a port table for the network device, a MAC address table, and a VLAN table based on the classification of the real time data. For example, the real time data can indicate a loss of performance of the network device and the tables can be updated to increase the performance of the network device.

Instructions 332, when executed by a processing resource can generate a data set based of the plurality of attributes and the plurality of statistical properties. In some examples, the attributes include an event and the statistical properties include a ratio between executed database operations and predicted database operations for a time period of the event.

In some examples, generating the data set can include instructions to clean the data set, assign a training subset of the data set, and assign a testing subset of the data set. As used herein, cleaning the data set can include removing outlier values from the data set. As used herein, assign a training subset of the data set can include taking a portion of a larger data set to use as a training data set. As used herein, assigning a testing subset of the data set can include taking a portion of a larger data set to be utilized for testing the network device and/or taking a specific portion of a larger data set that represents a testing phase for the network device.

In some examples, the data set can include a table that includes a ratio of database operations performed and the expected database operations performed. In some examples, the data set can also include a corresponding quantity of time it takes the network device to perform a function or perform the database operation for each of the ratios. In some examples, the data set can be a plurality of data points collected during a testing phase of the network device. In some examples, a testing phase can be a period of time when the network device is not performing normal functions and is being monitored or tested with a testing load or testing protocol. In this way, a data set can be a representation of performance for the network device with different testing scenarios.

In some examples, the data set can be utilized to generate a graphical representation of the data set. In some examples, a graphical representation can include an x-axis that is a quantity of time to perform a particular function or database operation and a y-axis that represents the ratio of the database operations performed to the expected database operations. In some examples, the graphical representation can be utilized to cluster or separate areas of the graphical representation into a plurality of clusters. As described herein, each of the plurality of clusters can correspond to a particular performance level (e.g., low, high, normal, etc.).

Instructions 334, when executed by a processing resource can cluster, into a plurality of clusters, the generated data set using an unsupervised machine learning mechanism. In some examples, the data set can be utilized to generate a graphical representation that can be utilized to cluster different areas of the graphical representation. The plurality of clusters can be based on the data set and corresponding performance of the network device. In some examples, the unsupervised machine learning mechanism can include a machine learning algorithm that can be performed on the data set and/or the graphical representation to determine the position of the clusters on the graphical representation and/or a range of values for each of the plurality of clusters. As used herein, an unsupervised machine learning mechanism can include building a model of a data set (e.g., graphical representation, table, etc.) used as input observations and generating predictions or outputs based on the input observations without input from a user. In some examples, the generated data set can be clustered using a K-Means clustering unsupervised machine learning mechanism.

Instructions 336, when executed by a processing resource can create a classifier for each of the plurality of clusters using a supervised machine learning mechanism and based on labels received by the switching device for each one of the plurality of database operations. In some examples, the plurality of clusters can be generated based on the machine learning mechanism. In some examples, the supervised machine learning mechanism can include inputs from a user. For example, in some examples, a user can remove particular outliers or add inputs to the machine learning mechanism. In some examples, the instructions 336 can include instructions to create the classifier for each of the plurality of clusters using a decision tree supervised machine learning mechanism.

In some examples, the plurality of clusters can be based on labels received by the switching device. For example, labels generated by the machine learning algorithm can be assigned by a subject matter expert or a computing device based on a particular objective. In one example, the objective can be to classify and/or segregate data on performance lines. Thus, the labels that are generated can be include, but are not limited to under performance, expected performance, and super performance. In some examples, once the clusters are generated, the labels can be applied by the subject matter expert and/or computing device.

Instructions 338, when executed by a processing resource can dynamically classify new database operations continuously received at the switching device using the created classifiers. In some examples, dynamically classifying new database operations can include receiving and classifying real time database operations based on a value of the real time database operation. For example, the value of the real time database operation can be input into the machine learning mechanism and/or the graphical representation to determine which cluster the real time database operation is associated with. In some examples, each real time database operation can be classified based on the data points position within the graphical representation. In this way, real time database operations can be dynamically classified without having to perform a calculation on the data received from the network device. Having to perform a calculation for the real time database operations could be time consuming and/or utilize additional computing resources.

In some examples, the instructions 338 can include instructions to make network traffic determinations based on the dynamic classifications. For example, a first switch can include a classification with a "low" performance metric and a second switch can include a classification with a "high" performance metric. In this example, network traffic can be directed to the second switch and/or network traffic can be directed away from the first switch to avoid network traffic from having to pass through a network device with a relatively low performance metric.

Figure 4:
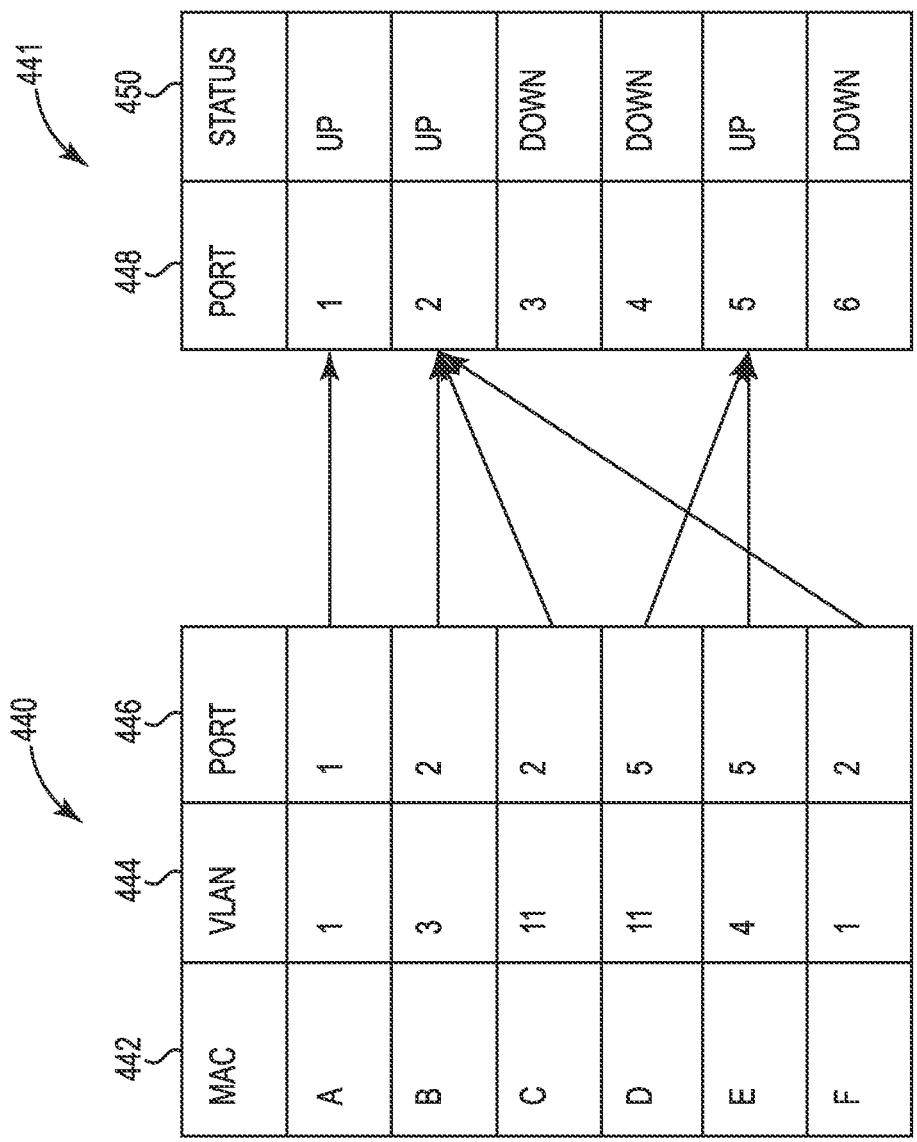
FIG. 4 is an example of a database operation identifier table consistent with the present disclosure.

FIG. 4 is an example of a database operation identifier table consistent with the present disclosure. FIG. 4 illustrates a unique client device identifier table 440 including unique client device identifier attributes, such as, Media Access Control (MAC) identifier 442, VLAN information 444 and port information 446. As traffic passes through a network device, a source unique client device identifier from each packet can be recorded by a network device, and a VLAN and port on which the traffic entered the network device is noted. In the example illustrated in FIG. 4, MAC identifier A can correspond to VLAN 1 and port 1 for a network device, MAC identifier B can correspond to VLAN 3 and port 2, and so on.

In some examples, a database operation can include an operation where a VLAN from column 444 is altered or deleted. As illustrated in FIG. 4, a change or alteration in table 440 can affect a change in table 441. In some examples, table 441 can be a port status table that indicates a plurality of ports for a network device (e.g., switch) with a corresponding status of the port (e.g., up, down, etc.). In some examples, the unique client device identifier table 440 can be stored and utilized by a first network device and the port status table 441 can be stored and utilized by a second network device. In these examples, the first network device and the second network device can be a part of the same network. Thus, it can be beneficial for changes in the unique client device identifier table 440 to be reflected with corresponding changes in the port status table 441.

In some examples, the port column 446 can illustrate how a plurality of devices are utilizing a particular port of a network device (e.g., switch) and the port column 448 can illustrate a status of ports associated with the same network device. In some examples, a change in the port column 446 in table 440 can affect the port column 448 in table 441. In addition, a change in the VLAN column 444 can affect the status column 450. For example, the VLAN 1 in column 444 associated with port 1 in the port column 446 can be removed and the status "up" in the status column 450 can be changed to "down". These types of database operations can be monitored as described herein to generate a ratio of database operations performed to expected database operations.

Figure 5:
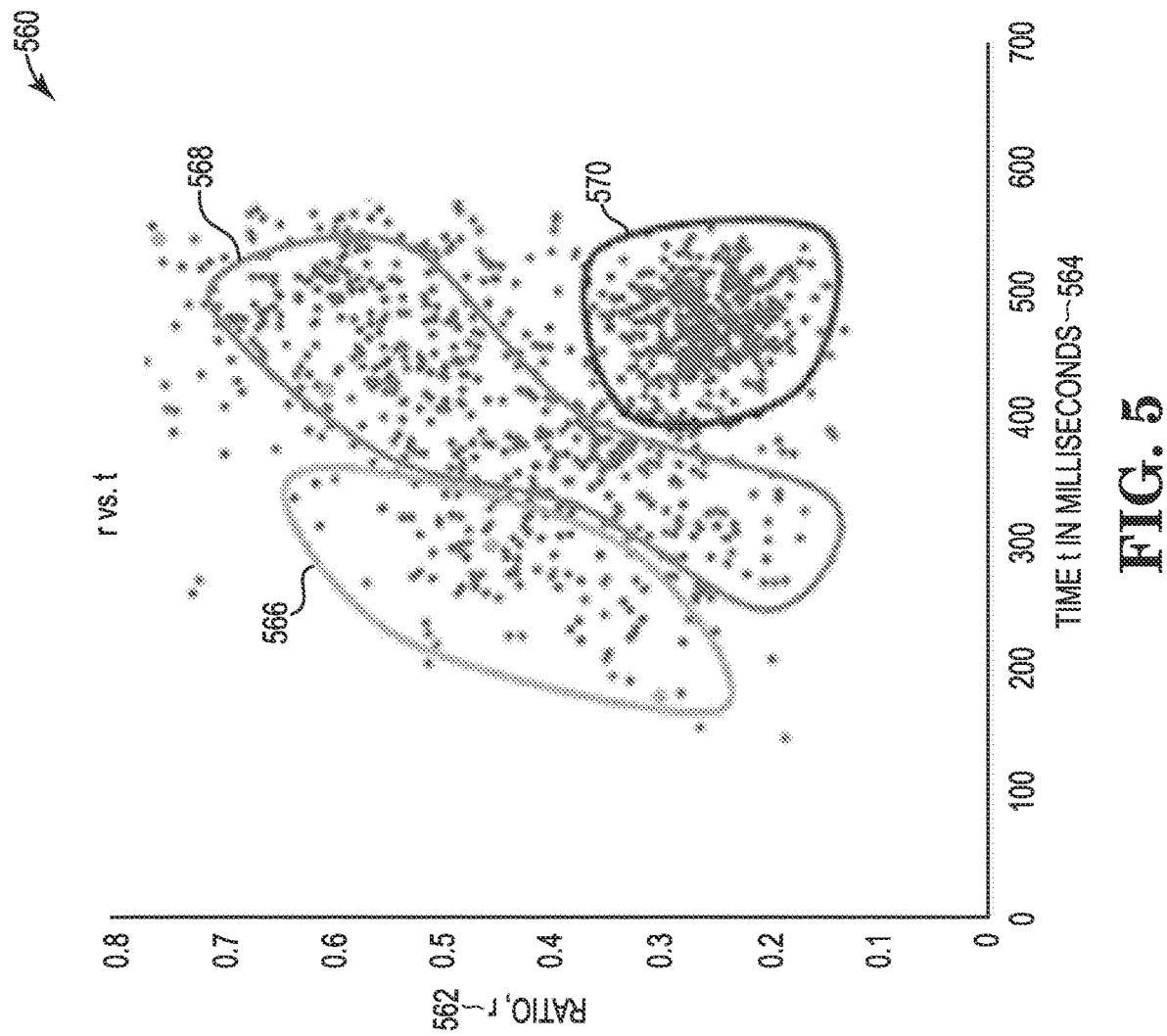
FIG. 5 is an example clustering diagram consistent with the present disclosure.

FIG. 5 is an example clustering diagram 560 consistent with the present disclosure. The clustering diagram 560 can be a graphical representation of a data set. For example, the clustering diagram 560 can be dot graph that can include a plurality of points that each represent a particular data point of the data set. In some examples, the clustering diagram 560 can include an x-axis 564 and a y-axis 562. In some examples, the x-axis 564 can be time. In some examples, the time can be a quantity of time it takes for a network device to perform a database operation. In some examples, the y-axis 562 can be a ratio of the database operations performed over expected database operations for a particular time period.

Each point (e.g., dot, data point, etc.) in diagram 560 can represent a database operation ratio. As described herein, the database operation ratio can be a ratio of database operations performed over expected database operations for a particular time period. In some examples, the graphical representation or clustering diagram can be clustered into three non-overlapping and inclusive categories 566, 568, 570. In other words, each database operation ratio of the clustering diagram 560 can be classified into one unique category among categories 566, 568, 570. While three categories are illustrated in FIG. 5, more or fewer categories may be used.

In some examples, each of the categories 566, 568, 570 can each represent a different performance metric. For example, category 566 can be a "high" performance metric (e.g., points within category 566 perform at a relatively higher performance than expected). In another example, category 568 can be a "normal" performance metric (e.g., points within category 568 perform as expected by the manufacturer). Furthermore, in another example, category 570 can be a "low" performance metric (e.g., points within category 570 perform lower than expected or relatively slower than expected).

In some examples, the clustering diagram 560 can be utilized to dynamically classify real time database operations by determining which category of the plurality of categories 566, 568, 570 the real time database operation data point is within. For example, a network device with a real time database operation within category 566 would result in a "high" performance metric, a network device with a real time database operation within category 568 would result in a 'normal' performance metric, and a network device with a real time database operation within category 570 would result in a "low" performance metric. In this way, performance metrics for network devices can be generated more quickly and with less computing resources compared to previous methods of calculating the performance metric.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature can refer to any number of such elements and/or features.

What is claimed:

1. A method comprising:
tracking, by a network device, a plurality of database operations performed for an event that executes for a time period;
generating, by the network device, a plurality of clusters based on a ratio of the database operations performed compared to a plurality of expected database operations for the event and the time period;
classifying, by the network device, the clusters based on performance; and
determining, by the network device, system performance degradation based on a classification of real time data into the clusters.

2. The method of claim 1, further comprising the network device comparing historic ratios of the database operations to real time ratios to determine alterations of a system performance metric over a period of time based on the classification of real time data into the clusters, wherein the alterations are indicative of system performance degradation.

3. The method of claim 1, wherein classifying the plurality of clusters includes identifying a location of the clusters within a graphical representation of the ratio and time period for the event.

4. The method of claim 3, wherein each of the plurality of clusters cover a non-overlapping area of the graphical representation.

5. The method of claim 1, wherein generating the plurality of clusters includes utilizing a machine learning clustering mechanism to generate a model of a plurality of data points based on the ratio.

6. The method of claim 1, further comprising the network device determining when the classification of real time data has changed from a first cluster to a second cluster.

7. The method of claim 6, further comprising the network device generating a notification when the real time data has changed from the first cluster to the second cluster.

8. A network device comprising a processing resource in communication with a memory resource including instructions executable to:
continuously track a plurality of database operations performed for an event that executes for a time period;
separate the plurality of database operations performed into a plurality of database operation types;
generate a plurality of clusters for each of the plurality of database operation types based on a ratio of the database operations performed compared to a plurality of expected database operations and the time period for the event for each of the plurality of database operation types;
classify the clusters for each of the plurality of operation types based on performance; and
determine system performance degradation based on a classification of real time data into the clusters for at least one of the plurality of database operation types.

9. The network device of claim 8, wherein each of the plurality of database operation types corresponds to an operation performed by a computing device.

10. The network device of claim 9, wherein each of the plurality of database operation types correspond to the event during the time period.

11. The network device of claim 8, wherein the network device is a switching device.

12. The network device of claim 11, further comprising the network device to update a port table for the network device, a MAC address table, and a VLAN table based on the classification of the real time data.

13. The network device of claim 8, further comprising the network device to compare real time ratios with historic ratios for each of the plurality of operation types to determine the system degradation.

14. The network device of claim 8, further comprising the network device to: evaluate a system performance metric for each of the plurality of database operation types based on the classification of real time data into the clusters, and combine the system performance metric for each of the plurality of operation types to determine a network device performance metric.

15. A non-transitory computer-readable medium storing instructions executable by a processing resource to:
track a plurality of attributes associated with each one of a plurality of operations performed on one or more data tables associated with a switching device;
cluster, into a plurality of clusters, the plurality of operations based on the plurality of attributes;
categorize the clusters based on performance of a network;
evaluate a system performance metric based on classification of real time data into the categorized clusters; and
identify a system degradation based on the evaluated system performance metric.

16. The non-transitory computer-readable medium of claim 15, wherein the instructions are further executable to generate the clusters based on a ratio of the operations performed compared to a plurality of expected operations.

17. The non-transitory computer-readable medium of claim 15, wherein the plurality of attributes comprises at least one of: VLAN information, port information, and statistical properties associated with the switching device.

18. The non-transitory computer-readable medium of claim 15, wherein the one or more data tables associated with a switching device comprises at least one of: a MAC address table, a VLAN table, and a port table.

19. The non-transitory computer-readable medium of claim 18, wherein tracking the plurality of attributes associated with each one of a plurality of operations performed on one or more data tables associated with a switching device comprises determining at least one of the MAC address table, the VLAN table, and the port table is altered.

20. The non-transitory computer-readable medium of claim 15, wherein the system degradation is at least one of a deterioration of the switching device in performance capability, change in network topology, and failure of the network.

* * * * *